(12) United States Patent
Steiner (10) Patent No.: US 7,295,132 B2
(45) Date of Patent: Nov. 13, 2007

(54) SELF-LOCATING DEVICES VIA HIGHLY DIRECTIONAL RFID TAGS IN CONTROLLED LOCATION

(75) Inventor: David John Steiner, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 10/967,763

(22) Filed: Oct. 16, 2004

(65) Prior Publication Data

US 2006/0092072 A1    May 4, 2006

(51) Int. Cl.
*H04Q 1/00* (2006.01)

(52) U.S. Cl. .............................. 340/825.49; 340/5.91; 705/14; 235/383

(58) Field of Classification Search ........... 340/825.49, 340/5.91, 10.1, 539.13, 568.5, 572.1, 988; 235/383, 385; 705/14, 26; 701/218
See application file for complete search history.

(56) References Cited

U.S. PATENT DOCUMENTS

| | | | |
|---|---|---|---|
| 4,882,724 A * | 11/1989 | Vela et al. ..................... 705/14 |
| 4,973,952 A * | 11/1990 | Malec et al. ............... 340/5.91 |
| 5,701,127 A | 12/1997 | Sharpe |
| 5,821,513 A * | 10/1998 | O'Hagan et al. ........... 235/383 |
| 5,995,015 A * | 11/1999 | DeTemple et al. ..... 340/825.49 |
| 6,069,564 A | 5/2000 | Hatano et al. |
| 6,122,329 A | 9/2000 | Zai et al. |
| 6,127,928 A | 10/2000 | Issacman et al. |
| 6,184,841 B1 | 2/2001 | Shober et al. |
| 6,320,509 B1 | 11/2001 | Brady et al. |
| 6,441,740 B1 | 8/2002 | Brady et al. |
| 6,456,234 B1 * | 9/2002 | Johnson ................. 342/357.09 |
| 6,687,609 B2 | 2/2004 | Hsiao et al. |
| 7,005,968 B1 * | 2/2006 | Bridgelall ................ 340/10.42 |

\* cited by examiner

*Primary Examiner*—Edwin C. Holloway
(74) *Attorney, Agent, or Firm*—Mark E. McBurney; Dillon & Yudell LLP (57) ABSTRACT

A monitored area is provided multiple RFID tags placed at defined coordinates/locations throughout the extended area. These RFID tags respond to receipt of a RF signal by transmitting/broadcasting their unique identifier (ID) within the specific area in which the tag is located. A device, whose location within the monitored area is desired, is equipped with an RFID interrogating device, such as an RF transceiver, which periodically broadcasts RF interrogation signals. The multiple RFID tags are positioned at specific areas within the environment to allow the RF interrogating device to (1) receive the RFID signal and (2) utilized the received data to independently determine the device's location.

14 Claims, 5 Drawing Sheets

SELF-LOCATING DEVICES VIA HIGHLY DIRECTIONAL RFID TAGS IN CONTROLLED LOCATION

BACKGROUND OF THE INVENTION

1. Technical Field

The present invention relates in general to RFID technology, and in particular to a method and system for using RFID technology to locate devices. Still more particularly, the present invention relates to a method and system for cost-effectively locating devices using RFID technology.

2. Description of the Related Art

The use of radio frequency (RF) identification (RFID) technology to locate devices that are equipped with an RFID tag (i.e., an electronic tag that emits an RFID signal when triggered by an RF signal) is generally known in the art. In conventional systems, a number of RF transceivers are provided in a monitored environment. These transceivers generate and transmit RF signals in a particular sub-area defined by the strength of the RF signal and location of the RF transceiver relative to the area of projection.

Thus, in a retailed environment, for example, the RF transceivers may be placed in the ceiling of the retail environment, and the area of projection is some diameter immediately below the RF transceiver. The transceivers are placed at a measured distance apart from each other with enough signal strength to reach the edge of the signal from an adjacent RF transceiver.

The transmitted RF signals are received by RF devices designed to respond to receipt of the RF signal by transmitting/broadcasting an identification signal in return. A typical RF device is the RFID tag, which is a low-logic (and passive) electronic component that transmits a signal containing a stored ID of the tag whenever an RF interrogation signal is sensed by the tag. When an RF interrogation signal is received by the RFID tag, a coil within the tag is energized and causes an internal chip to rebroadcast the tag's ID, which is received by the interrogating device (e.g., RF transceiver).

Typical RFID tags are omni-directional or wide viewing angle devices that do not lend themselves to receiving or producing directional signals. Because of this limitation, locating the particular RFID tag requires utilization of multiple RF interrogation devices. In this and other RF location sensing applications, readings of RF signal strength from multiple interrogating RF devices are utilized to triangulate the position of an RFID tag (or other RF device). This process often yields errors due to attenuation of RFID signal strength, etc.

In order to perform the device locating service over a large area, a large number of interrogating devices are required to continually triangulate the position of a tag, which is moved around in the area. Additionally, a background computing device must be connected to these interrogating devices to complete the triangulation calculations. Use of such a large number of high-logic (active) devices tends to be rather costly. Each high logic device is substantially more expensive to obtain than the low-logic tags. Also additional expense is incurred because each interrogating device must be powered and a central processing system that performs the triangulation calculations must be provided. Also, the triangulation method is inherently inaccurate because signal strength of the tag received by respective devices varies due to attenuation and other factors.

The substantial cost in implementing the above described device locating system by using a large number of high-logic devices limits the ability to implement the system on a large scale. Additionally, with current methods, there is no way to inform the user of the user's location relative to the RFID sensors, absent a feedback to the user of the results of the triangulation. The present invention provides a generally applicable solution to overcome these and other limitations found with the above described system.

SUMMARY OF THE INVENTION

Disclosed is a method and system for enabling cost-effective location sensing of a device via radio frequency (RF) technology in a monitored environment. A monitored area is provided multiple RFID tags placed at defined coordinates/location throughout the extended area. These RFID tags respond to receipt of a RF signal by transmitting/broadcasting their unique identifier (ID) within the specific area in which the tag is located. The broadcast may be directional based on a pre-set waveguide utilized when mounting the RFID tags.

A device, whose location within the monitored area is desired to be known (or determined), is equipped with an RFID interrogating device, such as an RF transceiver, which periodically transmits/broadcasts RF interrogation signals and receive RFID signals. The multiple RFID tags are positioned at specific areas within the environment to allow the RF interrogating device to (1) receive the RFID signal and (2) utilized the received data to independently determine the device's location.

When the RF transceiver sends a signal in vicinity of an RFID tag, the RFID tag responds with its unique ID, which is received at the RF transceiver. The received unique ID is provided to a processing system associated with the RFID device.

The processing system retrieves a pre-stored table, which maps/pairs unique IDs to physical locations in the extended area. Using the unique ID, the current location of the RFID interrogating device is found from the table and outputted to a user of the RFID device.

In one implementation, the RFID tags are placed in a waveguide tuned to the tags operating frequency and application. Utilization of the waveguide also increases the tags effective range (directionally) and possibly reduces the amount of power required to interrogate the tag.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention provides a method and system for enabling cost-effective location sensing of a device via radio frequency (RF) technology in a monitored environment. A monitored area is provided multiple RFID tags placed at defined coordinates/location throughout the extended area. These RFID tags respond to receipt of a RF signal by transmitting/broadcasting their unique identifier (ID) within the specific area in which the tag is located. The broadcast may be directional based on a pre-set waveguide utilized when mounting the RFID tags.

In one implementation, the RFID tags are placed in a waveguide tuned to the tags operating frequency. Utilization of the waveguide also increases the tags effective range (directionally) and may reduce the amount of power required to interrogate the tag.

A device, whose location within the monitored area is desired to be known (or determined), is equipped with an RFID interrogating device, such as an RF transceiver, which periodically transmits/broadcasts RF interrogation signals and receive RFID signals. The multiple RFID tags are positioned at specific areas within the environment to allow the RF interrogating device to (1) receive the RFID signal and (2) utilized the received data to independently determine the device's location.

When the RF transceiver sends a signal in vicinity of an RFID tag, the RFID tag responds with its unique ID, which is received at the RF transceiver. The received unique ID is provided to a processing system associated with the RFID device.

The processing system retrieves a pre-stored table, which maps/pairs unique IDs to physical locations in the extended area. Using the unique ID, the current location of the RFID interrogating device is found from the table and outputted to a user of the RFID device.

Thus, rather than utilizing multiple high-logic interrogating devices (which tend to be relatively expensive) to track an RFID tag on a device, the device whose location is being tracked is provided with a single interrogating device, and the room or area within which the device is being tracked is equipped with multiple RFID tags (which are inexpensive compared to the RF interrogating device).

RFID Interrogation Device

Figure 1:
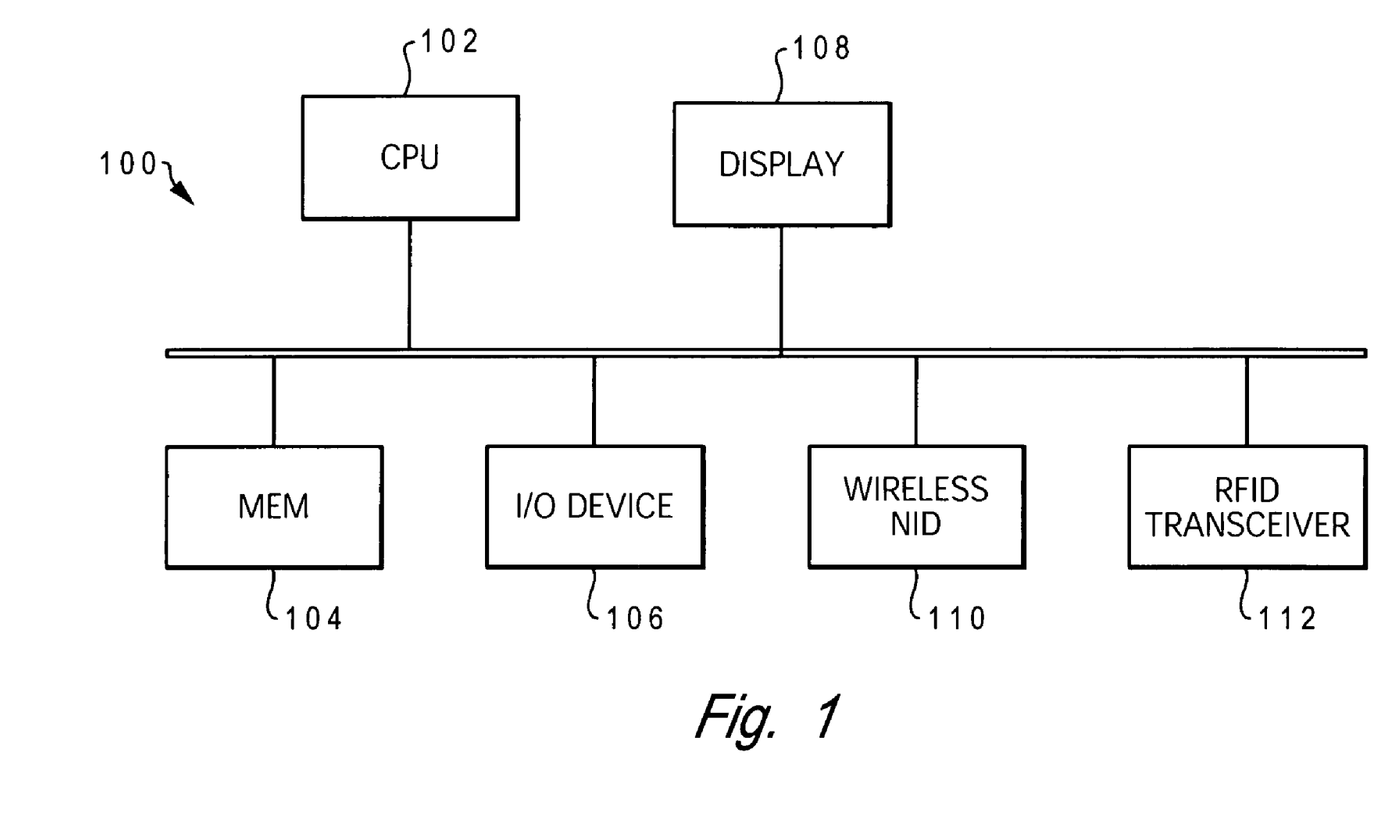
FIG. 1 is a block diagram of a data processing system, which may be utilized as an exemplary device within which a preferred embodiment of the present invention maybe implemented.

With reference now to the figures, and in particular with reference to FIG. 1, there is depicted the basic structure of an exemplary RFID device, with internal processing functionality. As shown, RFID interrogating device 100 includes a system interconnect 101 to which is couple processor (or CPU) 102, memory 104, and I/O devices 106 (keyboard, graphical pointing device, etc.), and display monitor 108. RFID device 100 also comprises wireless network interface device (NID) 110 and RF transceiver 112. RFID device 100 may have many additional components which are not shown, and may be configured in a different manner than shown.

For example, RF transceiver 112 may be an external component to RFID device 100. The configuration illustrated herein is solely for illustration and not meant to impose any structural/functional limitations on RFID device 100. Also, while referred to herein as RFID device 100 to maintain consistency throughout the description, those skilled in the art appreciate the RFID device may be a functional component within a larger system, such as a portable computer, hand held computing device, cellular telephone, etc. In the illustrative embodiments, RFID device 100 is provided within a shopping aid utilized to locate products within a retail environment, as will be described below.

Depending on its specific functional use, RFID device 100 includes a location utility and other software components stored on memory 104 and executed by CPU 102. Also, in one embodiment, RFID device 100 communicates with a remote computer system via wireless transmission made possible with its wireless NID 110. Where information is required to be entered and/or displayed to a user, that information is respectively entered and displayed using the I/O devices 106 and display monitor 108 of RFID device 100.

Finally, RF transceiver 112 transmits RF interrogating signals to RFID tags 215 and receives RFID signals from RFID tags 215. As further described below, RFID device 100 emits (via RF transceiver 112) an RF interrogation signal, which triggers the return of identifying data from RFID tags 215 within range of the transmitted signal. The data is received by RF transceiver 112 and forwarded to the CPU which executes a device location utility that determines the current location of RFID device 100 from the tag ID. The location information may then be utilized to provide other features programmed into the RFID device 100.

As stated above, one particular application of the invention is to aid in a retail environment. While other applications are possible, the invention is described hereinafter with a specific implementation, for ease of understanding. No functional limitations are implied by the reference to this specific application. Thus, although the invention is being described with reference to its application within a retail environment, use of RFID tag placement to effect locating devices via RF interrogating signals may be applied to non-retail environments as well.

Placement of RFID Tags in Retail Environment

In order to implement the functional application of the invention, (i.e., enable location sensing of the RFID device), the retail environment is designed with directional tags placed at a calculated distance apart from each other, but covering the entire space in which an RFID device may travel.

Figures 2A, 2B:
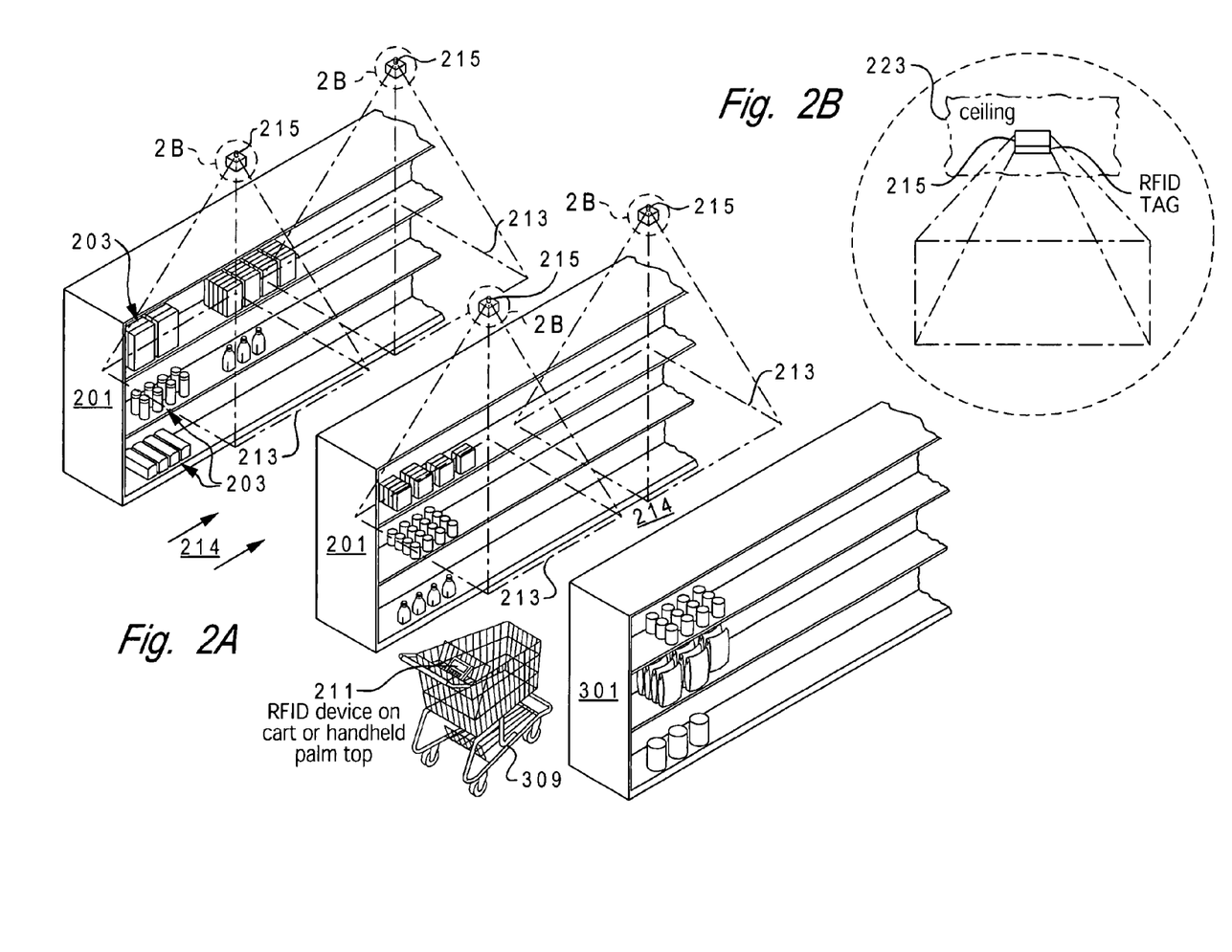
FIG. 2A is a block diagram of an exemplary retail environment equipped with RFID tags for sensing location of a device in accordance with one embodiment of the present invention.
FIG. 2B is a diagram depicting an individual view of an RFID tag recessed in the ceiling of the retail environment of FIG. 2A according to one embodiment of the present invention.

FIG. 2A illustrates an exemplary retail area 300 in which the locating feature of the invention may advantageously be utilized. Retail environment, depicted as a grocery store-type retailer includes a plurality of rows of shelving units (or shelves) 201 with products 203 placed thereon. An aisle 214 is provided between each row of shelves 201. Located at spaced intervals above each aisle 214 are a number of RFID tags 215 (only 2 shown per aisle in the illustration). As shown by FIG. 2B, these tags 215 are recessed in the ceiling 223 of the building housing the retail environment.

When triggered, each tag 215 emits an RFID signal into a predefined signal area 320 in the aisle 214 below. In the illustrative embodiment, the signal area 320 is a rectangular area projected downwards below the tag 215. Different placement of the tags 215 may be provided (e.g., on the side of the shelves 201 facing the aisle 214), and the projection of the RFID signal from the tag 215 may then vary in shape, size, direction, and strength.

Thus, although the RFID signal area 320 is illustrated as a rectangular-shaped area, it is understood that the signal may be projected to yield a different shaped signal area. For example, the recessed RFID tag may also produce a cone-shaped signal area that covers a circular area of aisle 214 in front of shelves 201. In a preferred embodiment, RFID tags 215 are spaced so that the projected signal area 320 does not intersect with the signal areas of adjacent RFID tag 215.

Figure 3:
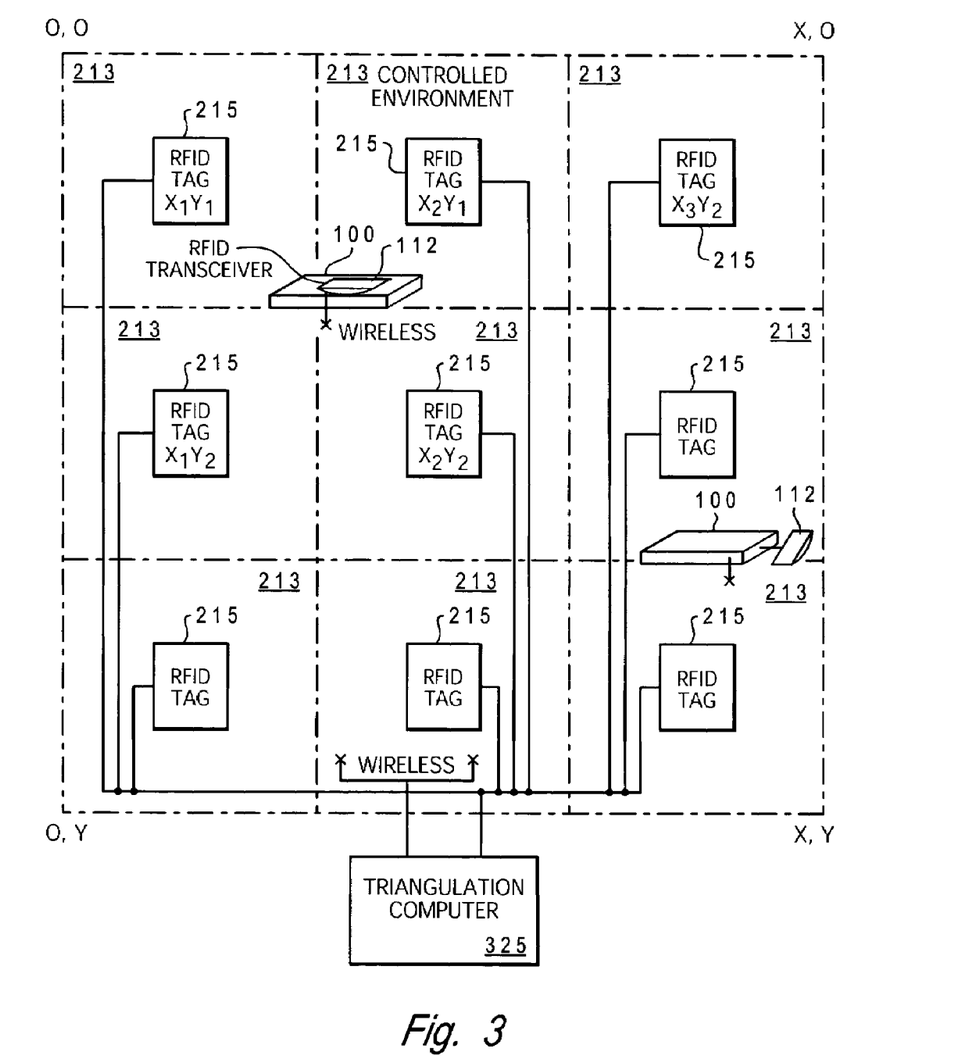
FIG. 3 is a plan diagram illustrating a horizontal pattern/layout of areas covered by signals generated by respective recessed RFID tags in accordance with one embodiment of the present invention.

2 Dimensional Layout of Physical Area to Accommodate RFID Locating Functionality FIG. 3 illustrates a two-dimensional layout of a retail space 300, having X and Y coordinates representing the entire length and width of the space 300. This retail space is X units long by Y units wide (or vice versa), and has coordinates along the X direction ranging from 0 to Y units and coordinates along the Y direction ranging from 0 to X units.

Within retail space 300 are placed several directional RFID tags 215, each of which has a different X, Y location coordinate and unique tag ID. Only 9 of these tags are illustrated within retail space 300. However, it is understood that the number of tags may be very large (e.g., hundreds or thousands). The actual number of tags 215 is dependent on a plurality of factors including (1) size of retail space 300, strength of signal generated by each tag, desired preciseness of location result, etc. A waveguide is utilized to determine the actual placement of each RFID tag.

As further shown, each tag 215 is surrounded by a signal area 320. These signal areas 320 represent the area in which a signal generated by the RFID tag 215 can be recorded by an interrogation device (such as RF transceiver 112 of RFID) device 100). The signal areas 320 may be uniform or may be different shapes/sizes depending on the strength of the signal generated by the particular tag 215 or the location relative to interference signals, etc. For simplicity, the signal areas 320 are shown having equal sizes with clearly defined borders. In practical application, however, it is probable that the adjacent signal areas 320 overlap at the shared borders.

Although not clear in the two-dimensional view, each RFID tag 215 may be placed in the ceiling of the building (enclosing the retail area), as described above with reference to FIGS. 2A and 2B.

Application of RFID Device as Shopping Aid

Figure 4:
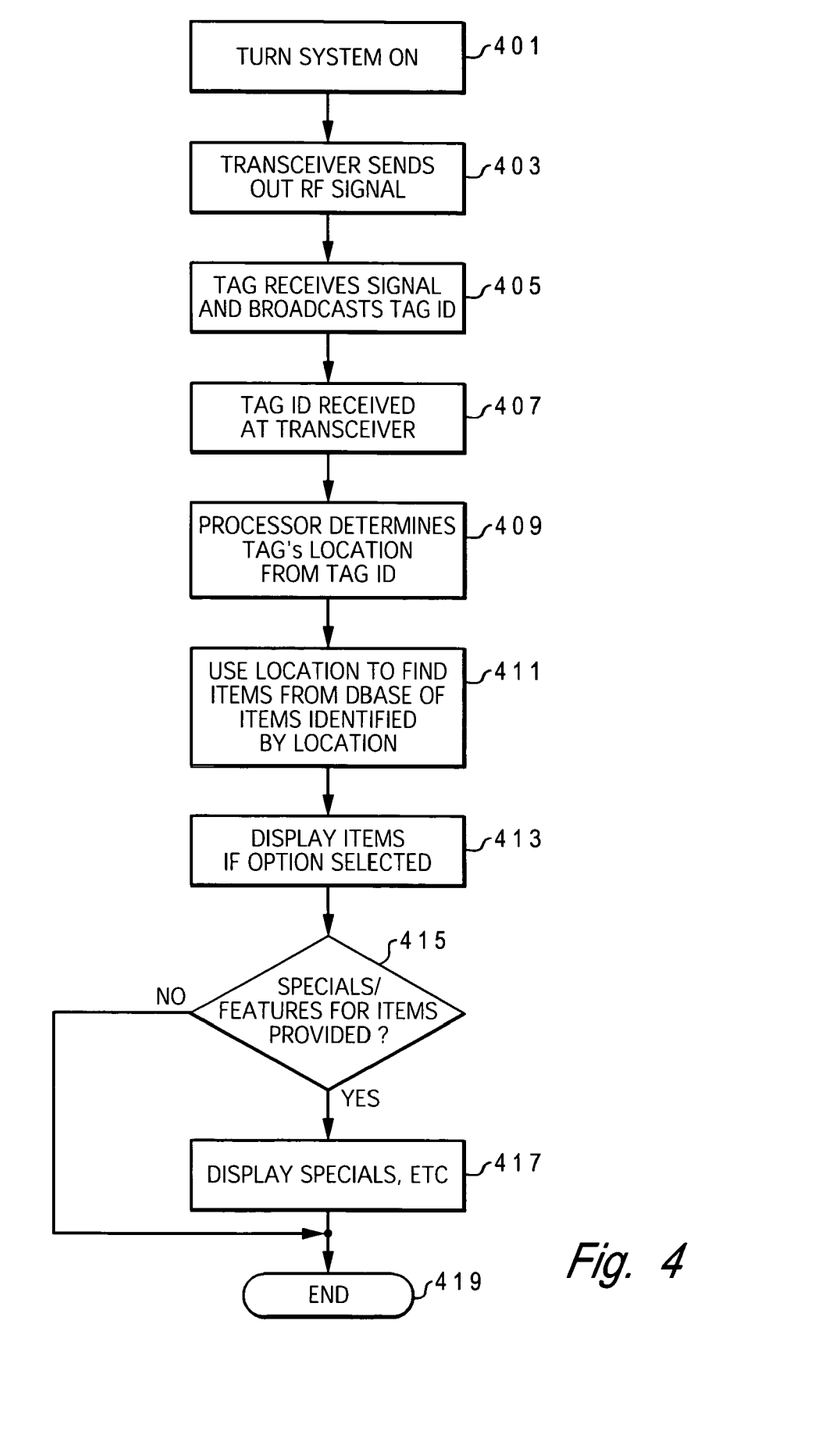
FIG. 4 is a logic flow chart of the process of determining a location of a device using the RFID tag locations received at the device, according to one embodiment the present invention.

Returning now to FIG. 2A, there is also illustrated a shopping cart 309 customized with an RFID device 209 that is utilized to aid in locating items in the retail environment 200. The process by which the locating functions are completed is illustrated by FIG. 4. Before the RFID device 209 can be utilized to complete the locating functions, the device must first be programmed with an RFID location utility. This location utility is an application program that executes on the CPU 109 of the RFID device 209 and completes several or all of the following functions: (1) parse the received RFID signal(s) to obtain one or more unique IDs of the RFID tags in vicinity of the shopping cart/RFID device; (2) determine/calculate/look-up the location of the shopping cart using the received unique ID(s) of the RFID tags 215; (3) output the location to a user interface of the RFID device 209; and (4) output pre-programmed information about products at the location.

With specific reference to FIG. 4, the process begins at block 401 when the RFID device is turned on in the retail environment. The RFID device sends out an RF interrogation signal at block 403. The signal is received by one or more tags within the vicinity and the tag responds by broadcasting its tag ID, as shown at block 405. The tag ID is received by the RF transceiver at block 407, which retrieves the tag ID (or tag IDs if more than one tag is in the vicinity) and forwards the tag ID to the location utility executing on the processor. The location utility determines the location of the tag ID at block 409.

Figure 6:
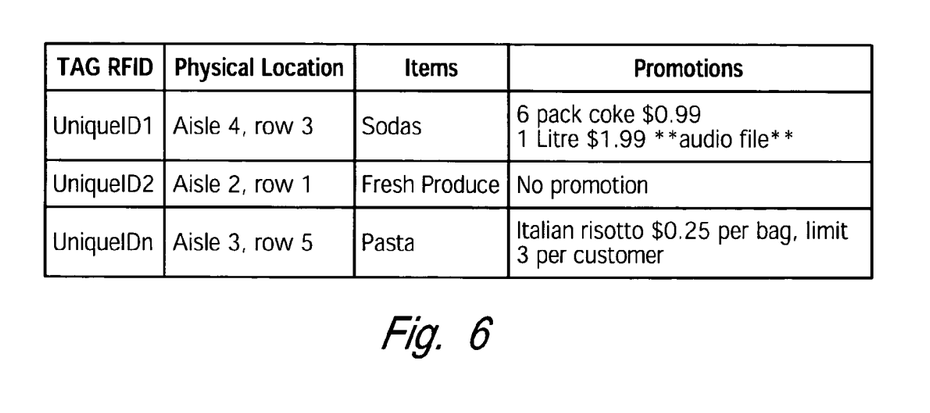
FIG. 6 illustrates an exemplary look-up table pairing unique IDs of RFID tags to actual physical locations.

This location is then considered the current location of the shopping cart. Notably, determining the location may involve utilizing a look-up table with tag IDs paired against their physical tag locations. This look-up table is also a component of the location utility and is stored in memory of the RFID device 209. An exemplary look-up table is illustrated by FIG. 6. As shown, look-up table 600 comprises several rows divided up into columns of information. These columns of information include tag ID column 602, associated physical location 604, list of items 606, and items promotions 608. Using the tag ID, the corresponding physical location can be retrieved from the table. Once the physical location is identified, the list of available items in that location is available in the list of items 606, and any associated promotions linked to specific items are provided.

The look-up table may be provided as a retail software product that allows a potential customer to improve his/her shopping experience with an RFID device-enabled shopping cart. The RFID device 209 may be attached to the shopping cart or a portable customer unit. Whether the customer purchases the device himself or pays a lease fee for use of the device, the cost of the high-logic RF interrogating device is borne by a user who wishes to utilize the service and take advantage of the convenience provided by having the RFID device 209.

Returning to FIG. 4, once the processor has completed the determination of the physical location, the location may then be utilized at block 411 to identify items from a database of items listed at that location. These items are then displayed as illustrated at block 413. A determination is made at block 415 whether there are special discounts, or advertisements, or other features related to the items at that location. If there is some feature associated with one or more of the items in the location, such as a current discount on an item, that feature is outputted (e.g., displayed) to the user (perhaps along with the item), as shown at block 417.

For example, the promotion may include a jingle, which is played on the RFID device 209 advertising an item in the location identified by the received tag ID. Alternatively, a visual advertisement may be displayed on the display of the RFID device 209. The promotion items are locally stored within memory of the RFID device 209, and updates to these promotions may be provided via wireless transmission from a centralized computer system (e.g., an RF transmitter transmitting signals generated by a background computer system that includes the list of items and associated promotions).

In one embodiment, a palmtop computer is utilized in place of the RFID device 209. The RF interrogation feature is provided via a functionality of the palmtop computer which operates as a data processor having memory for storing the look-up table. If the comparison results in a match of a product, then the product and applicable price and discount is displayed on the palmtop computers display screen. The customer is therefore alerted to the presence of the particular product on a nearby shelf or product area and provided all relevant pricing and discount information simultaneously. Typically, palmtop computers are customer owned devices.

The waveguides are tuned for ceiling height and floor area to ensure proper coverage and fit within accuracy requirements. With the waveguide utilized to place the RFID tags 215, a single tag ID is returned to the RFID device 209. However, in an advanced embodiment, the location utility includes programming to complete a triangulation at the RFID device of multiple received tag IDs. Thus, when multiple tag IDs are returned when the RFID device broadcasts an interrogation signal, the processor implements a more advanced determination process that performs an internal triangulation to determine to which tag the shopping cart is closest (or the location of the cart relative to the responding tags). This embodiment may also entail a more advanced RF transceiver that also records the strength of each signal and provides the strength of the signal along with the tag ID.

Figure 5A:
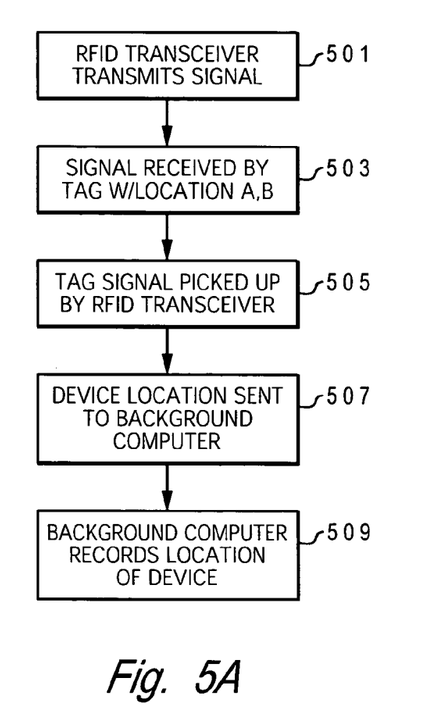
FIGS. 5A and 5B are two implementations of a logic flow chart depicting the process of determining a location of a device using the RFID tag locations received at a background processing system in accordance with two other embodiments of the present invention.

FIG. 5A illustrates a second embodiment by which the location of a device is determined. The process begins at block 501 at which the RFID device transmits a query (interrogation) signal. The signal is received by a tag with a specific location (A, B), as shown at block 503. The tag responds to a receipt of the interrogation signal by issuing/transmitting its unique ID along with the location (A, B). This signal is picked up by the RF transceiver of the RFID device as shown at block 505. Then, the RFID device's location may be sent via a wireless transmitter to a background computer at block 507. The background computer records the location of the RFID device at block 509. This information may then be utilized in some background process not directly connected to finding out the location of the device.

With the above implementation, while an internal triangulation is provided, no triangulation of signals and/or recording of received signal strengths by a background triangulation computer system are required. In one embodiment, RFID device 209 receives RF signals modulated with the actual location of the tags, and is able to retrieve the location information from the signal. No actual calculation or determination of the location is required. Thus the above embodiments are significantly more cost effective for the retailer than conventional implementations. Also, the above embodiments are relatively less expensive to implement for the retailer than conventional methods.

Use of Triangulation and Background Computer

An alternative embodiment is provided, which actually utilizes the triangulation computer in determining the location of the RFID device. This alternate embodiment, which is also less costly than conventional methods because of the use of the low cost RFID tags in lieu of RFID interrogation devices, is described below.

Figure 5B:
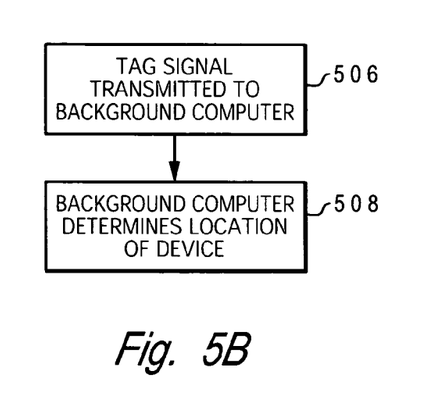

According to the embodiment of FIG. 5B, the tag ID and/or location information is not sent to the RFID device. Rather, as shown at block 506, the tag ID is transmitted directly to the background computer. This may involve the configuration of FIG. 3, where the tags are connected to the background computer. The background computer receives the information from the tag and determines the location of the device, as depicted at block 508.

Returning to FIG. 3, RFID these tags 215 are shown linked to a background triangulation computer 325. Triangulation computer is sent a signal from the RFID tag 215 whenever a particular one of the RFID tags 215 is triggered by an RFID interrogation signal from an RFID device 209. Similarly to the triangulation utility of the RFID device 209, triangulation computer 325 determines the physical location of the RFID device 209 that issued the interrogation signal by using the received data (tag IDs with signal strengths) from the RFID tag 215 triggered by the interrogation signal. The location is then either utilized for a background device-monitoring process or is transmitted to the RFID device 100 via a wireless communication device. When the location communicated to the RFID device via wireless communication, the RFID device 100 is then able to utilize the location to perform other functions such as displaying an advertisement for a product in that location.

It should be noted that the above description provides one alternative embodiment in which the tags are hardwired to a background computer. This embodiment may prove attractive to implement where the structure is designed with the wires already in place, e.g., with a structure previously configured for the more expensive interrogation devices. The other embodiments described herein provide the tags as stand alone components (i.e., not wired to another functional component). Irrespective of the method utilized, the RFID interrogating device is able to determine its physical location as it moves through the retail area by periodically issuing RF signals and receiving a directly or indirect response from the tag or tags within range of the interrogation signal.

As a final matter, it is important that while an illustrative embodiment of the present invention has been, and will continue to be, described in the context of a fully functional computer system providing network access-request management functionality, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A system comprising:
    a plurality of stationary, location signaling devices capable of transmitting a unique identification (ID) in response to a received interrogation signal, said location signaling devices placed at predefined locations within a physical area;
    a mobile interrogation device that periodically generates an interrogation signal that is broadcasted within the physical area;

a computer with a wireless transmitter by which the computer communicates with the mobile interrogation device via wireless transmission, wherein said computer is further connected to the location signaling devices;

wherein each location signaling device is wired to the computer and at least one of the location signaling devices receives the interrogation signal and transmits, in response, an associated unique ID to the computer;

wherein the computer determines the location of the mobile interrogating device from the location of the location signaling device whose unique ID is received at the computer and the computer transmits, via wireless transmission, information associated with the location to the mobile interrogation device; and wherein the associated information is received by the interrogation device from the computer.

2. The system of claim 1, wherein said stationary, location signaling devices are placed based on a pre-formulated waveguide that enables transmission of each unique ID from within its own unique sub-area within the physical area, whereby only a single unique ID is received by the computer for that interrogation device's interrogation signal when the interrogation device is within the sub-area.

3. The system of claim 1, wherein the interrogation device comprises:
a signal generating component that generates and transmits said interrogation signal;
a signal receiving component that receives said associated information, which is utilized to determine a current location of the interrogation device within the physical area; and
a processing component that completes a determination of the current location of the interrogating device utilizing said associated information.

4. The system of claim 3, wherein the interrogation device further comprises:
an output device; and
wherein said processing component provides said current location to said output device.

5. The system of claim 3, wherein the interrogation device further comprises:
an output device; and
wherein, when an output of said current location is tagged to provide additional pre-programmed information, said processor provides said pre-programmed information as output to the output device.

6. The system of claim 5, wherein:
said physical area is a retail environment with one or more products distributed across the retail environment at specific locations identified with localized location signaling devices; and
when at least one of said one or more products has an advertisement/promotion related to the product as the pre-programmed information, said processor provides said product advertisement/promotion to the output device, which outputs the advertisement/promotion to an output component of the interrogation device.

7. The system of claim 3,
wherein said interrogation device comprises a wireless receiver and a RF receiver, and said interrogation device receives: (a) the associated information transmitted from the computer via wireless transmission; and (2) the unique ID as an RF signal broadcasted from the location signaling device when the location signaling device receives the interrogation signal; and wherein the interrogation device includes processing code for determining the device's current location using at least one of the associated information and said unique ID.

8. The system of claim 7, wherein said processing code includes code for performing triangulation to determine a relative location of the interrogating device when more than one unique ID is returned to the interrogation device in response to the interrogation signal.

9. The system of claim 3, wherein said interrogating device further comprises a memory device with a table pairing unique IDs against known physical locations of the location signaling devices, wherein said processor determines the current location of the interrogating device by looking up the location corresponding to the unique ID in the table.

10. The system of claim 1, wherein the interrogation signal is a radio frequency (RF) signal and said location signaling devices are RF identification (ID) tags, and wherein said interrogation device transmits an RF signal that triggers said RFID tag to transmit the unique ID.

11. A device comprising:
a radio frequency (RF) interrogation component having an RF transmitter and receiver;
logic for periodically issuing from the RF transmitter an RF interrogation signal into a surrounding area to trigger transmission of a unique RFID of a closest, stationary RFID generating component to a computer to which the device is wireless connected;
a wireless receiver by which the device communicates with the computer;
means for receiving information associated with the current location of the device from the computer, which received the unique RFID from the RFID generating component, wherein the computer is programmed to transmit the information to the device on receipt of the unique RFID, which receipt triggers a determination of the current location of the device and inclusion of the current location within the information transmiffed to the device;
an RFID receiver and associated logic for receiving the unique RFID from the closest stationary RFID generating component within the surrounding area;
a memory component with a table pairing a plurality of unique RFIDs for RFID generating components with a specific location of the RFID generating component; and
processing logic for determining a current location of the self-locating device utilizing one of: (a) the unique RFID received from the RFID generating component, wherein the processing logic includes logic for retrieving the table and finding the current location of the stationary RFID generating device corresponding to the unique ID received; and (b) the information received by the device from the computer.

12. The device of claim 11, wherein said table further includes a list of items within each location of the physical area and promotions associated with specific ones of the items, wherein:
said device further includes an output device; and
said processing logic further includes logic for outputting the promotions associated with the items within the current location of the self-locating device.

13. A method comprising:
connecting a plurality of RFID tags placed at pre-selected locations within a physical area to a computer, wherein said connecting comprises placing said RFID tags at locations identified by a waveguide designed to enable a single, corresponding unique ID to be transmitted when an interrogation signal is detected by the RFID tag within a pre-defined sub-area of the physical area;

providing an RF interrogation device that periodically broadcasts the interrogation signal into the physical area to trigger a return of a unique ID of a closest RFID tag;

wherein an RFID tag in vicinity of the interrogation signal transmits, in response to the interrogation signal, the corresponding unique ID to the computer via wired transmission, and the corresponding unique ID to the interrogating device via RF broadcast;

determining the current location of the interrogating device utilizing the received unique ID, wherein said determining is completed via at least one of: (a) the computer, which is wirelessly connected to the interrogating device, and which forwards information related to the current location to the interrogating device via wireless transmission; and (b) the interrogating device, wherein the determining includes:

retrieving a look-up table pairing unique IDs against specific locations; and matching the received ID to its specific location, wherein the specific location is selected as the current location of the interrogating device; and when there are promotions associated with items in the current location, outputting the promotions at the interrogating device, wherein a specific output may be provided from among one or more of: the current location within the physical area; a list of items in the current location, promotions associated with specific ones of the list of items in the current location, availability of pre-selected items within the current location, and directional information related to a location of other pre-selected items.

14. The system of claim 1, wherein said computer comprises program code for:

determining when there are promotions associated with items in the current location, identified by the unique ID;

forwarding the promotions within the associated information transmitted to the mobile interrogation device for output thereon, wherein a specific output may be provided from among one or more of: a current location within the physical area, a list of items in the current location, promotions associated with specific ones of the list of items in the current location, availability of pre-selected items within the current location, and directional information related to a location of other pre-selected items.

* * * * *